United States Patent
Degutis et al.

(10) Patent No.: US 8,894,102 B2
(45) Date of Patent: Nov. 25, 2014

(54) EDUCTION TUBE ASSEMBLY

(75) Inventors: Alex V. Degutis, La Grange Park, IL (US); Raymond P. Bass, Beaumont, TX (US); Peter J. Gubricky, Crest Hill, IL (US)

(73) Assignee: Salco Products, Inc., Lemont, IL (US)

( * ) Notice: Subject to any disclaimer, the term of this patent is extended or adjusted under 35 U.S.C. 154(b) by 979 days.

(21) Appl. No.: 12/755,960

(22) Filed: Apr. 7, 2010

(65) Prior Publication Data

US 2011/0204626 A1    Aug. 25, 2011

Related U.S. Application Data

(60) Provisional application No. 61/306,118, filed on Feb. 19, 2010.

(51) Int. Cl.
*F16L 23/032* (2006.01)
*F16L 47/14* (2006.01)

(52) U.S. Cl.
CPC .............. *F16L 23/032* (2013.01); *F16L 47/14* (2013.01)
USPC ............ 285/368; 285/364; 285/411; 285/412

(58) Field of Classification Search
USPC ................... 285/368, 123.3, 123.12–123.14, 285/205–222, 364, 406, 411–415; 403/335–337
See application file for complete search history.

(56) References Cited

U.S. PATENT DOCUMENTS

| | | | | | |
|---|---|---|---|---|---|
| 1,464,585 | A | * | 8/1923 | Rasmussen | 285/123.4 |
| 1,566,257 | A | * | 12/1925 | Trout | 285/123.12 |
| 1,623,587 | A | * | 4/1927 | Frederickson | 220/3.94 |
| 1,739,802 | A | * | 12/1929 | Rasmussen et al. | 285/123.12 |
| 1,862,515 | A | * | 6/1932 | Gray | 285/192 |
| 2,175,550 | A | * | 10/1939 | Neebe | 285/145.3 |
| 2,517,821 | A | * | 8/1950 | Allen | 285/123.14 |
| 4,850,617 | A | * | 7/1989 | Moberly | 285/42 |
| 5,718,460 | A | * | 2/1998 | Glunt et al. | 285/148.22 |
| 5,961,155 | A | * | 10/1999 | Youngs | 285/139.1 |
| 6,079,751 | A | * | 6/2000 | Youngs | 285/139.1 |
| 6,612,620 | B1 | * | 9/2003 | Nordstrom et al. | 285/139.1 |

* cited by examiner

*Primary Examiner* — Aaron Dunwoody
*Assistant Examiner* — Fannie Kee
(74) *Attorney, Agent, or Firm* — Leydig, Voit & Mayer, Ltd.

(57) ABSTRACT

An eduction tube assembly made of ultra high molecular weight polyethylene material for use on a containment vessel for corrosive liquids. It includes a vertical eduction tube and a unitary transition flange member having a first flange for connection of the assembly to an attachment flange associated with the vessel and a second flange to receive a connected hose flange. A single segmented ring with multi-directional capability is disposed between the flanges and receives securement elements to accomplish both connections. Bolts are used for one connection, upstanding threaded studs secured to the segmented ring are used for the other.

22 Claims, 4 Drawing Sheets

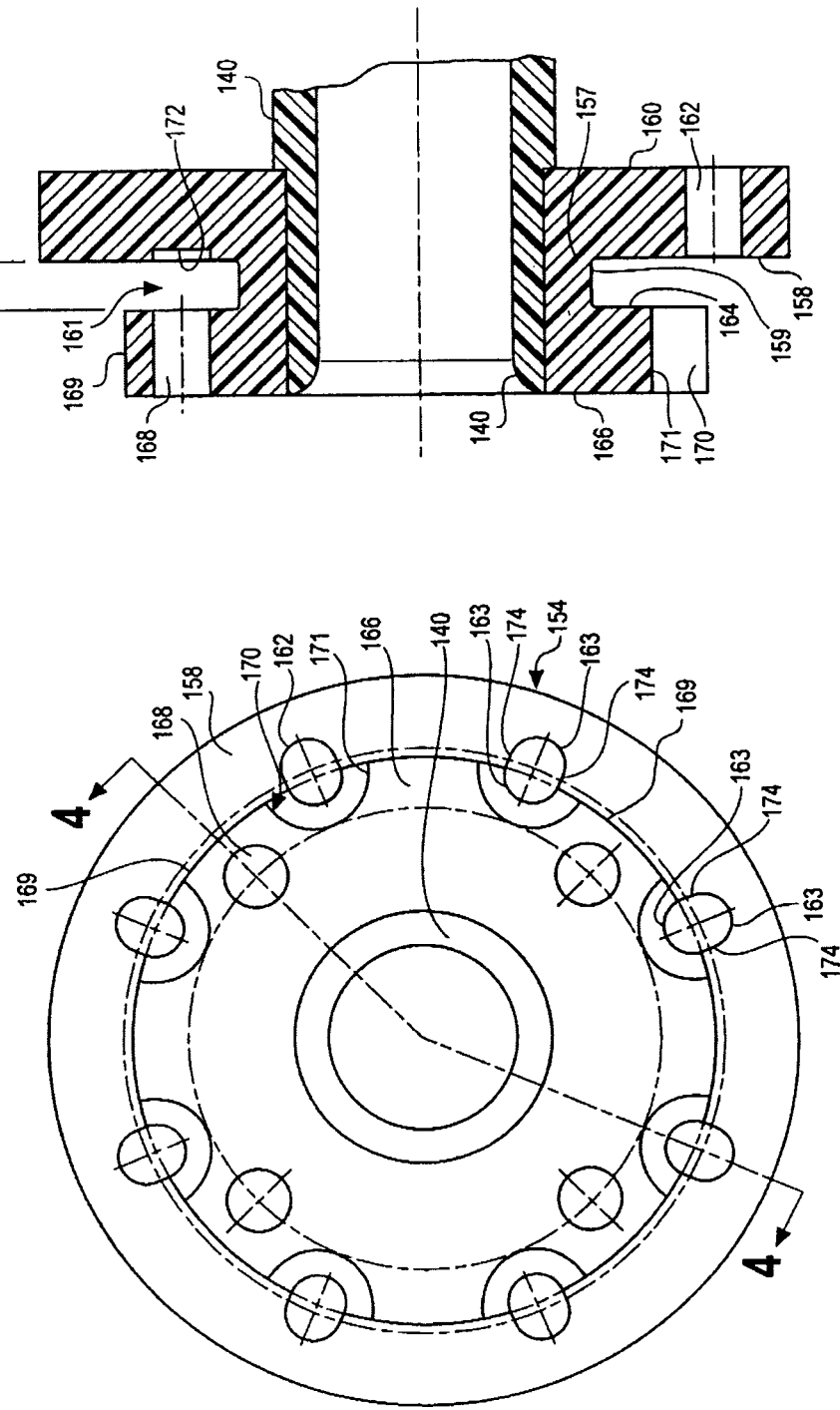

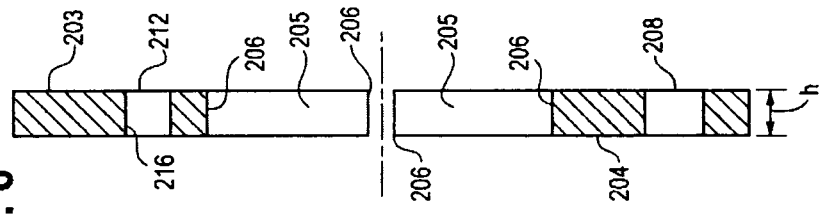
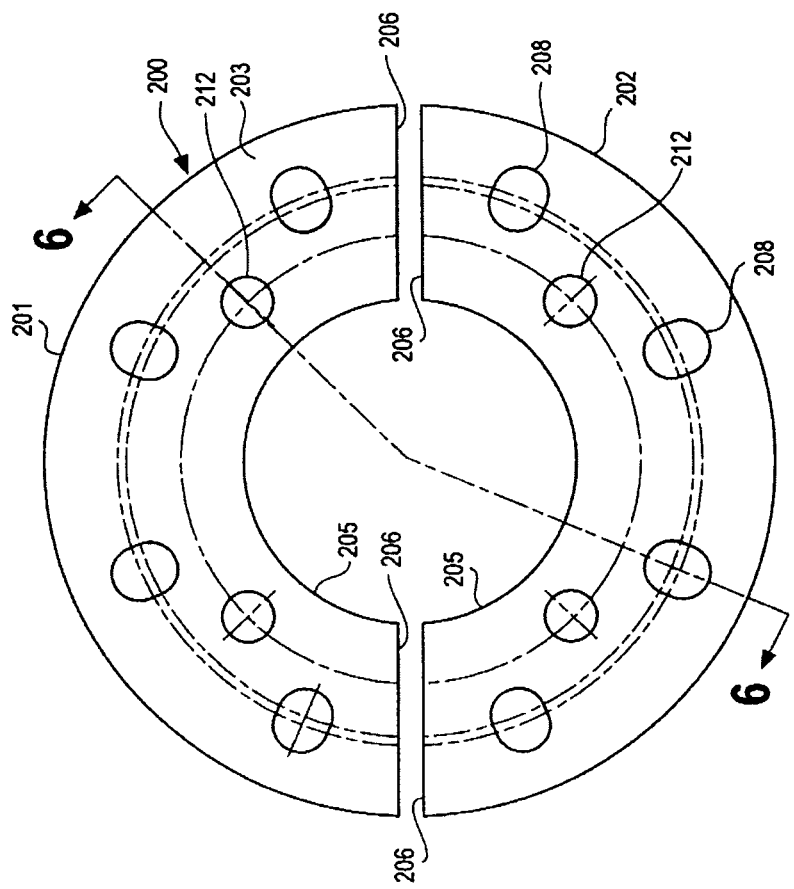

EDUCTION TUBE ASSEMBLY

CROSS-REFERENCE TO RELATED APPLICATIONS

This patent application claims the benefit of U.S. Provisional Patent Application No. 61/306,118, filed Feb. 19, 2010, which is incorporated by reference.

RELATED SUBJECT MATTER

This disclosure is related to non-metallic piping components for systems involving transfer of liquid corrosive to metal. More particularly, it relates to such components that provide a transition between flanged components of different sizes.

BACKGROUND OF THE INVENTION

Handling of liquids in various disciplines such as chemical or petroleum processing involves storage, shipment and transfer of material highly corrosive, or otherwise deleterious, to containment equipment made of metal. Accordingly, it is necessary to isolate the contact surfaces of the equipment from the liquid.

In the past, containment vessels, as well as flow components such as metal tubes, elbows, tees, or the like, have been lined with rubber to isolate the contact surfaces from the corrosive liquid. More recently, plastic lines or plastic components have been employed to reduce the cost. Tubes, elbows, tees, and the like, have been made of PVC or other plastics. These components are relatively effective, but lack durability under the arduous conditions experienced, for example, in transporting the corrosive liquid by rail, or tractor trailer truck.

Most recently, piping components have been successfully made from ultra high molecular weight polyethylene (UHMWP). These components possess the requisite resistance to the liquids being handled and the necessary durability to make their use cost effective. Because piping system components and tubes are commonly joined together at flanged joints, bolted connections are the norm. Such joints must withstand the loads imparted by external forces during loading, transport and unloading of the liquid. Accordingly, it has been found necessary to utilize segmented washers made of metal to withstand, and distribute the forces associated with joinder of the flanged components using bolted connections. It is also often necessary to join flanged components of different sizes and bolt patterns and accomplish such connections within restricted spacing.

The present disclosure illustrates a particular piping component and its application in a railroad car containment vessel for transport of corrosive, or otherwise deleterious liquid. This component, an eduction tube assembly, incorporates the advantages of a flow passage impervious to the deleterious effects of the liquid being handled. It also comprises a component connected between different size flanges with different bolt patterns with reduced overall spacing between the connected components. Specifically the assembly incorporates a single segmented securement washer with multidirectional connectability. In this configuration, the assembly minimizes the separate component parts required as well as the overall length of the assembly in the direction of flow.

BRIEF DESCRIPTION OF THE SEVERAL VIEWS OF THE DRAWINGS

FIG. 3 is a front view of the transition flange member and eduction tube of the eduction tube assembly of the present disclosure.

FIG. 4 is a revolved side sectional view of the transition flange member and eductor tube of FIG. 3 taken along the line 4-4 of FIG. 3.

FIG. 5 is a plan view of the bidirectional segmented washer of the eduction tube assembly of FIG. 2.

FIG. 6 is a revolved sectional side view, of the segmented washer of FIG. 5 of the eduction tube assembly of FIG. 3 taken along the line 6-6 of FIG. 5.

DESCRIPTION OF ILLUSTRATED EMBODIMENTS

Turning now to the drawings, there is illustrated an eduction tube assembly for a containment vessel such as a railroad or vehicular tank car connected to a tank flange at an access opening into the car. The eduction tube assembly is employed to withdraw liquid from, or deliver liquid to, the car lading compartment or containment vessel.

Figure 1:
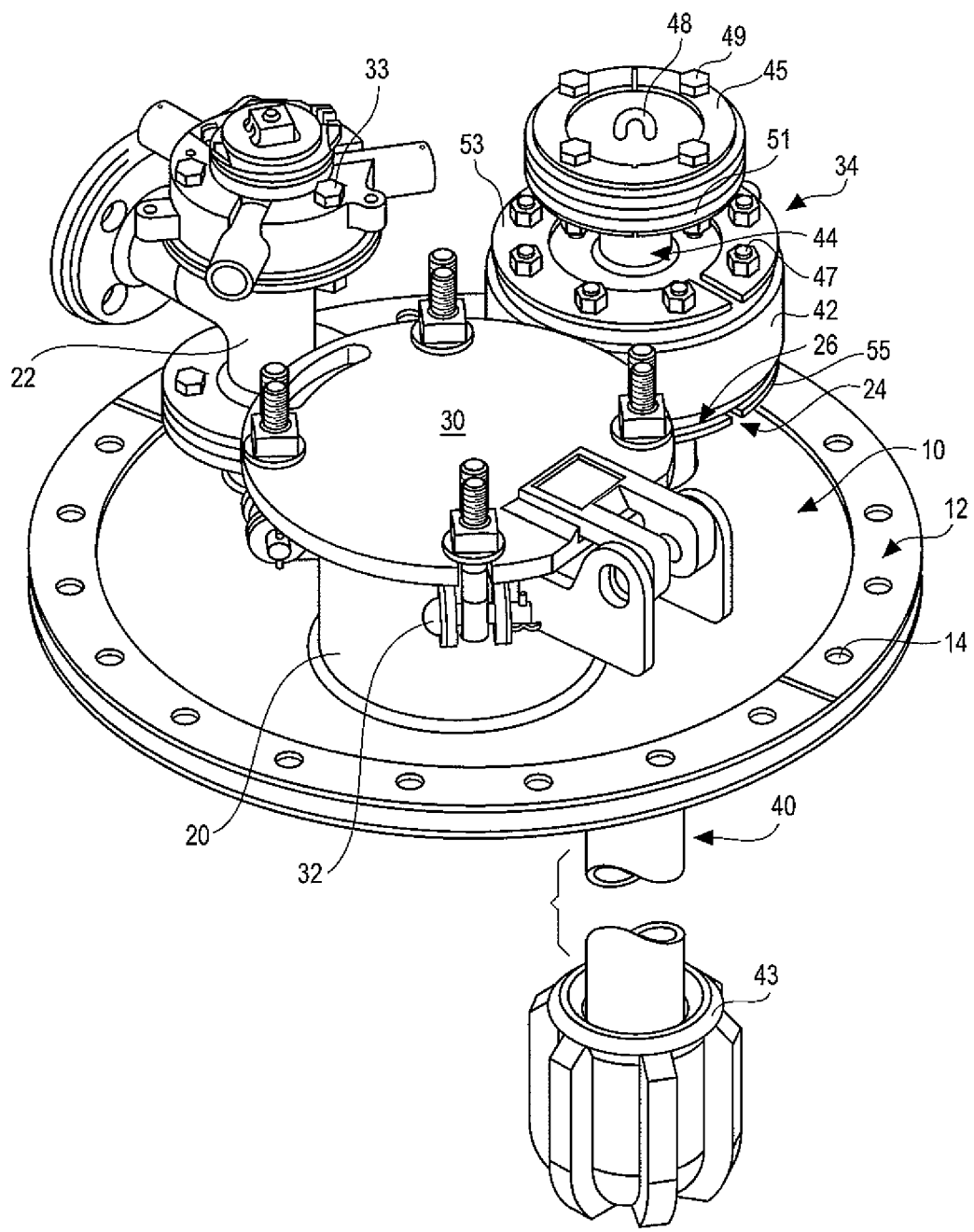
FIG. 1 is a perspective view of a conventional flange plate arrangement for a containment vessel such as a railroad tank car.

FIG. 1 illustrates a flange plate arrangement for a railroad tank car used in transporting corrosive liquid such as hydrochloric acid (HCl). The containment vessel comprises a tank with one or more access ports or hatches to facilitate loading and unloading. A typical tank arrangement includes a vertical cylindrical tubular cowling defining an access port. It includes an annular bolt flange at its upper end. A circular flange plate 10 is secured to the bolt flange about its outer periphery in fluid tight relation. Such a tank, could of course, be a stationary storage vessel or any similar containment for corrosive liquid.

The tank and tubular cowling are made of metal and have a rubber liner bonded to the surface to protect against the corrosive effects of the liquid being transported or stored. The metal flange plate 10 is similarly protected by a bonded layer of rubber or similar material impervious to the effects of the lading. A steel segmented washer 12 with bolt holes 14 is used to connect the flange plate 10 to the flange at the open end of the cowling of the vessel. The segmented washer distributes the compressive load of clamping bolts within holes 14 about the perimeter of the flange plate without damage to the impervious coating. It must be appreciated that reference to bolts, securement bolts, or clamping bolts includes a traditional threaded bolt-nut combination or threaded bolts associated with a flange with threaded holes.

The flange plate 10 illustrated in FIG. 1 includes tubular elements defining multiple access ports generally designated 20, 22 and 24. Port 20 is a fill port. It defines an access opening into the vessel or tank through which corrosive liquid lading is loaded. It includes a hinged cover 30 secured in a closed position by a series of eye bolts 32. The hinged cover 30 also provides for general access into the interior of the tank.

Tube tee 22 represents another access port. It supports a safety vent assembly 33.

Figure 2:
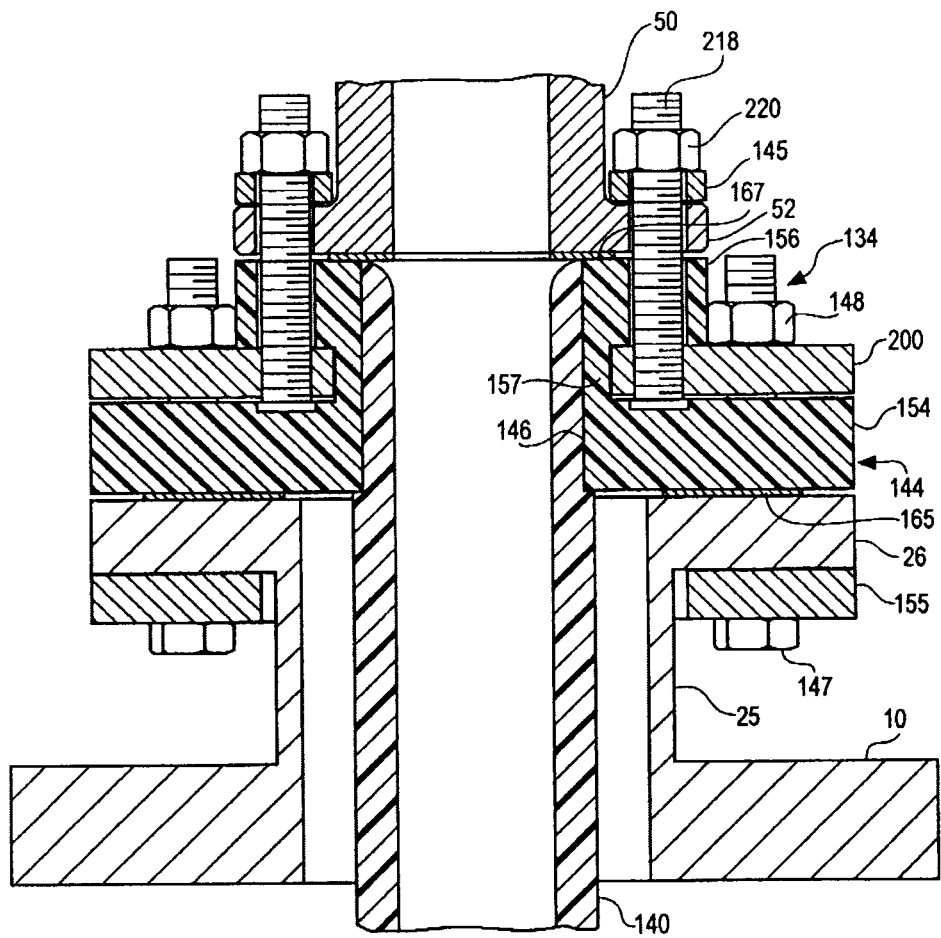
FIG. 2 is a side sectional view of an eduction tube assembly of the present disclosure installed on a flange plate of a containment vessel such as the flange plate of FIG. 1.

Access port 24, seen in cross section in FIG. 2 supports an eduction tube assembly 34 seen in FIG. 1. Access port 24 includes a vertical tubular portion 25 defining an access passage to receive eduction tube assembly 34. It includes an eduction tube assembly attachment flange 26 at its top which includes a plurality of equally spaced bolt holes on a given bolt circle diameter to receive securement bolts.

A conventional eduction tube assembly 34 is illustrated in FIG. 1. It is an assemblage of components secured by clamping bolts 47 to the eduction tube assembly attachment flange 26 of the flange plate 10. The eduction tube assembly 34 of FIG. 1 includes a closure cap 48 secured by bolts 49. However, with closure cap 48 removed, it is arranged to connect with a flanged end of a flexible hose present at a terminal facility receiving or supplying liquid lading.

Eduction tube assembly 34 includes a vertical eduction tube 40 that extends through the passage defined by vertical tubular portion 25 of access port 24 into the vessel or tank. A lower end is disposed adjacent the first of the vessel and includes a nozzle 43 through which liquid may be discharged into, or received from, the tank.

The eduction tube 40 includes a mounting flange 42 at its upper end sized and arranged to be secured to eduction tube assembly attachment flange 26 by bolts 47. The eduction tube 40 and attachment flange 42 may be made of ultra high density polyethylene.

The eduction tube assembly 34 also includes a separate, double flange component 44 secured above the mounting flange 42. It has a tubular body with a large flange at one end and a small flange at the other. The large flange is sized to be compatible with the hole pattern of the mounting flange 42 of the eduction tube 40 and eduction tube assembly mounting flange 26 of vertical tubular portion 25 of access port 24 and is secured by bolts 47. The small flange is sized and configured compatibly with a hose connection flange associated with the equipment at the facility receiving or delivering the lading.

A flexible hose arrangement is illustrated in FIG. 2. It includes a hose 50 with a connection flange 52 at its free end. Connection flange 52 of hose 50 has a plurality of equally spaced holes on a given bolt circle diameter to receive bolts 49 to connect it to the eduction tube assembly 34. The number of bolt holes is usually fewer, and the size of the bolt circle diameter usually smaller, than the number of bolt holes and size of the bolt circle diameter of the eduction tube assembly attachment flange 26. The double flange component 44 of the eduction tube assembly, therefore serves as a transition element between the vertical eduction tube 40 and the equipment of the facility.

For removal of liquid, a vacuum is drawn and liquid is caused to exit the tank through the eduction tube assembly 34 and attached hose. For filling, liquid is supplied into the tank from the hose through the eduction tube assembly 34.

The eduction tube assembly flange 26 of flange plate 10 is coated with rubber or polymeric material, as is the hose connection flange 52 and the double flange component 44. Therefore, segmented rings 45, 51, 53 and 55 are employed to distribute the compressive load of clamping bolt nut combinations 47 and 49. These segmented rings are comprised of two semi-circular annular rings which may be positioned about a pipe or other cylindrical component by radial insertion. The halves, when positioned, form a circular split annular ring about the cylindrical component. They include holes aligned with the holes in the associated flange. Segmented rings are made of steel and include holes appropriately sized and positioned to receive the clamping bolts. In this regard, the axial length of the double flange component 44 between the large flange and small flange accommodate the presence of the segmented rings 51 and 53 and associated clamping bolt nut combinations 47 and 49.

It should be noted that the bolted together flanges of the eduction tube assembly as well as the joints between the eduction tube assembly 34 and the eduction tube assembly attachment flange 26 and hose connection flange 52 represent leakage paths. Therefore, appropriate sealing gaskets are usually provided between the mating planar surfaces of the clamped flanges to ensure a fluid tight connection.

The eduction tube assembly of the present disclosure generally designated 134 is illustrated in FIGS. 2-6. It is a unitary structure with liquid contact elements made of ultra high molecular weight polypropylene (UHMWP). It is secured to the eduction tube assembly attachment flange 26 of access port 24 on flange plate 10. The eduction tube assembly 134 includes a vertical eduction tube 140 open at its ends. It is sized to pass through the vertical tubular portion 25 of access port 24 of flange plate 10 and extend into the tank of the car. It is sufficient to extend downward into a tank car vessel for effective delivery or removal of corrosive liquid.

The upper end of vertical eduction tube 140 is connected to transition flange member 144. The tube 140 is secured within a central bore of transition flange member 144 by spin welding, friction welding or other suitable process to form a fluid tight joint 146. Transition flange member 144 secures the eduction tube assembly 134 to the eduction tube assembly attachment flange 26 of the flange plate 10. It also provides the connection between the eduction tube assembly 134 and the hose connection flange 52 of flexible hose 50.

As seen in FIGS. 2 to 4, transition flange member 144 has a tubular body portion 157 with an outer cylindrical body surface 159. A first, or large, flange 154 and a second, or small, flange 156 are connected at opposite ends of the tubular body portion 157. Flange 154 connects to the eduction tube assembly attachment flange 26 of access port 24. Best seen in FIG. 4, first or large flange 154 includes an inner planar surface 158 facing toward small flange 156. It also includes bottom gasket surface 160 to mate with eduction tube assembly attachment flange 26 in fluid tight relation. It may include circumferential serrations to improve sealing. A sealing gasket 165 is usually employed between flanges 26 and 154.

Referring to FIGS. 3 and 4, a pattern of equally spaced radially elongated holes 162 are provided in large flange 154 to accept bolts 147 and nuts 148 to secure the joint.

The holes 162 are radially equidistant from the axial centerline of the transition flange member 144 and are radially elongated to accommodate bolt holes on different bolt circle diameters presented by eduction tube attachment flanges 26 of different flange plates 10. The radially elongated holes 162 include semi-circular end surfaces 163 formed with equal radii located on two different bolt circle diameters. These end surfaces 163 are joined by parallel side wall surfaces 174. Eight radially elongated bolt holes 162 are illustrated, disposed on radial lines forty-five degrees (45°) apart. The number, size and location can differ depending on the configuration of the eduction tube assembly attachment flange 26. Inner planar surface 158 of large flange 154 includes a series of circular reliefs or counter bores 172 vertically aligned with holes 168 of small flange 156 for reasons as will be explained.

Second or small flange 156 includes an inner planar surface 164 facing toward first or large flange 154. The inner planar surface 164 of small flange 156, inner planar surface 158 of large flange 154 and outer cylindrical body surface 159 of connecting tubular body portion 157 form an annular channel 161 having an axial height "H."

Small flange 156 also includes an outer top gasket surface 166 to mate with hose attachment flange 52 of flexible hose 50 in fluid tight relation. Surface 166 may include circumferential serrations for enhanced sealing. A sealing gasket 167 is usually employed between hose connection flange 52 and small flange 156 to provide a fluid tight relation.

Referring to FIG. 3, small flange 156 includes a pattern of equally spaced holes 168 located on a bolt circle diameter compatible with the holes presented by hose attachment flange 52 of flexible hose 50. In the illustrated arrangement, hose connection flange 52 includes four bolt holes located on a bolt circle diameter smaller than the bolt circle diameter of the holes in eduction tube assembly attachment flange 26 and consequently holes 162 in large flange 154.

The holes 168 are positioned ninety degrees (90°) apart on radial lines that bisect the circumferential spacing between adjacent elongated holes 162 in large flange 154. That is, the radial centerline of each hole 168 in small flange 156 is circumferentially spaced twenty-two and one-half degrees (22.5°) from a radial centerline of a radially elongated hole 162 in large flange 154. Again, the number, size and location of holes 168 can differ depending on the configuration of the hose attachment flange 52 of flexible hose 50.

As illustrated in FIG. 3, small flange 156 includes an outer peripheral edge surface 169 with a series of half circle notches 170 formed by semi-cylindrical walls 171 aligned with the pattern of elongated holes 162 of large flange 154. These notches provide access to the inner planar surface 158 of large flange 154 for manipulation of elements of securement bolts 147 during attachment of the eduction tube assembly 134 to flange 26. It is understood that the need for notches 170 is dictated by the relative size of the bolt circle diameters for the elongated holes 162 in large flange 154 and holes 168 in small flange 156. Were the elongated holes positioned radially outward to provide full access without interference by the radial extent of small flange 154, the notches could be eliminated.

The segmented ring 200 is best seen in FIGS. 5 and 6. It is an annular metal ring, split along a diametrical line to form two separate ring segments 201 and 202 which are essentially semi-circular. Usually it is made of steel.

The rings 201 and 202 have a planar top surface 203 and a planar bottom surface 204 defining the thickness or height "h" of the segmented ring 200 which is slightly less than the height "H" of the channel between the inner planar surface 158 of large flange 154 and inner planar surface 164 of small flange 156 of transition flange 144.

The segments 201 and 202 include an arcuate semi-circular central edge 205 and radial edges 206. The arcuate semi-cylindrical central edges 205 define a hole slightly larger than the diameter of outer cylindrical body surface 159 of connecting tubular body portion 157 of transition flange member 144.

The segmented ring 200 includes two patterns of holes. A first pattern, with radially elongated holes 208 matches the pattern of radially elongated holes 162 in the large flange 154. With the segmented ring 200 in position on the transition flange member 144 securement bolts 147 with nuts 148 pass through the holes 208 in segmented ring 200 and holes 162 in large flange 154 to secure the eduction tube assembly 134 to the eduction tube assembly attachment flange 26. As illustrated, a segmented ring 155 is employed between the bolt head of securement bolts 147 (or nuts 148 if insertion is from the top) and the eduction tube assembly attachment flange 26 to protect the protective lining on eduction tube attachment flange 26.

A second pattern, with threaded holes 212, matches the pattern of equally spaced holes 168 on small flange 156. Holes 212 are on a bolt circle diameter smaller than the pattern of radially elongated holes 208. A spot weld stop 216 is placed at the bottom surface 204 of each hole 212.

In use, the rings 201 and 202 are placed with the radial edges 206 in spaced, facing relation to present a single split circular ring formed of two parts separated by a slight gap between facing edges 206. The arcuate semi-circular central edges 205 surround the connecting tubular body portion 157 in facing relation to the outer cylindrical body surface 159. Because the segmented ring 200 is split into two segments, it is capable of placement about tubular body portion 157 of transition flange member 144 by inward radial movement transverse to the axial centerline of the transition flange member 144. The height or thickness "h" permits the surfaces 203 and 204 to pass between inner surfaces 158 and 164 of the large flange 154 and small flange 156 and reside within channel 161. In this regard, the height "H" between the inner planar surfaces 158 and 164 of large flange 154 and small flange 156 need exceed the height "h" of segmented ring 200 between planar top surface 203 and planar bottom surface 204 by a few thousandths of an inch. Generally a clearance of about 0.030 inch is adequate.

A similar clearance is contemplated between the arcuate semi-circular central edges 205 and the outer cylindrical body surface 159 of connecting tubular body portion 157. Note also that the ring segments 201 and 202 are not completely semi-circular. The radial edges 206 are about 0.130 inch from an imaginary diametral line. That is, when the ring segments 201 and 202 are positioned with the elongated holes 208 aligned with the elongated holes 162 of large flange 154 and the threaded holes 212 aligned with holes 168 of small flange 156, the facing radial edges 206 of the ring segments 201 and 202 are spaced apart about 0.260 inches.

As illustrated in FIG. 2, after the segmented ring 200 is positioned about the connecting tubular body portion 157, an upstanding threaded stud 218 extending through a hole 168 in small flange 156 is secured in each threaded hole 212. Each stud bottoms against spot weld stop 216 in threaded holes 212 to limit its entry into the hole 212 in the direction toward inner planar surface 158 of large flange 154. Since counter bores 172 in large flange 154 are aligned with equally spaced holes 168 in small flange 156, some tolerance is accommodated in the insertion of studs 212.

The length of threaded studs 218 is sufficient to extend through holes 168 in small flange 156 a sufficient distance to receive and secure hose connection flange 52 of flexible hose 50 to the eduction tube assembly 134. As illustrated in FIG. 2, the hose connection flange 52 is secured to the small flange 156 by nuts 220 positioned on threaded studs 218 and tightened to clamp the hose connection flange 52 to the small flange 156 of transition flange member 144. As illustrated, a segmented ring 145 may be employed to distribute the load about the facing surfaces of the joined flanges and minimize any damage to impervious coatings on the hose connection flange 52. It should also be noted that studs 218 and nuts 220 are also used to clamp a protective cap or closure (not shown) to small flange 156 to secure the flow passage between uses. Such a cap or closure is illustrated in FIG. 1, at 48.

The segmented ring 200 has multi-directional capability. The radially elongated holes 208 permit bolts 147 with nuts 148 to clamp the large flange 154 of transition flange member 144 of eduction tube assembly 134 to the eduction tube mounting flange 42 of a flange plate 10. The upstanding threaded studs 218 permit clamping of the hose connection flange 52 to the small flange 156 of transition flange member 144. This multi-directional capability provides the advantages of minimization of the overall axial length of the portion of the eduction tube assembly that extends above the eduction tube mounting flange 42. Potential for physical damage is reduced and capability for use in spaces of confined height is improved. Also, one segmented ring, such as segmented ring 51 of the tank flange arrangement of FIG. 1 is eliminated.

Because the liquid contacting surfaces of the eduction tube assembly 134 are all formed of material such as UHMWP impervious to the effects of the liquid being handled degrading or deterioration of the assembly is minimized. The need for rubber, polymeric or other lining of otherwise corrosion prone components is eliminated.

It is important to recognize that the transition flange member 144 and associated segmented ring 200 serve a function of connection of two spaced flanges (here, eduction tube assembly attachment flange 26 and hose connection flange 52 of hose 50) within a minimal axial length. This valuable aspect of the transition flange member 144 is independent of the presence or absence of education tube 140 in the assembly or the relative sizes of the flanges to be connected.

For example, diameter of the large flange 154 could be significantly larger, as large as the flange plate 10 of containment vessel and the small flange 156 could be sized as it is in the disclosed embodiment of transition flange member 144. In such an application, it is only necessary for the large flange to be of sufficient outer diameter to accommodate the bolt circle diameter of bolt holes 14 of segmented washer 12 as illustrated in FIG. 1. The holes 212 with threaded studs 218 would remain unchanged. Also, in such an arrangement, the notches 170 in small flange 156 would not be needed. The multi-directional capability of the segmented washer 200 with connected threaded studs 218 is independent of its use within the transition flange member 144 of an education tube assembly 134. A segmented washer made of split rings and sized to include a pattern of holes aligned with holes on bolt circle diameter of holes 14 and another pattern of threaded holes aligned with the holes in hose connection flange 52 could be used with the transition flange member just described.

All references, including publications, patent applications, and patents, cited herein are hereby incorporated by reference to the same extent as if each reference were individually and specifically indicated to be incorporated by reference and were set forth in its entirety herein.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An eduction tube assembly comprising:
   a unitary transition flange member,
   a tubular member having an axial length exceeding the length of said transition flange member,
   said transition flange member connected to said tubular member in fluid tight relation at an end thereof,
   said transition flange member having:
      a tubular body portion defining a central passage surrounding an end of said tubular member,
      a first flange at one end of said body portion having a pattern of spaced holes in a circumferential spacing,
      a second flange at the other end of said tubular body portion having a pattern of spaced holes positioned apart on radial lines bisecting the spacing of said holes on said first flange,
      said first flange having an inner planar surface facing said second flange,
      said second flange having an inner planar surface facing said first flange,
   a segmented ring defined by a first ring segment and a second ring segment, said segments including a planar top surface and a planar bottom surface,
   said segmented ring disposed between said inner planar surfaces of said first flange and said second flange and including a pattern of spaced holes aligned with said spaced holes in said first flange,
   and a pattern of spaced holes aligned with said spaced holes in said second flange.

2. An eduction tube assembly as claimed in claim 1 wherein said inner planar surfaces of said first flange and said second flange are spaced apart a distance slightly greater than a thickness of said ring segments of said segmented ring and said planar top surface and said planar bottom surface of said ring segments are disposed between said inner planar surfaces of said first flange and said second flange.

3. An eduction tube assembly as claimed in claim 2 wherein an outer cylindrical body surface of said tubular body portion of said transition flange member, said inner planar surface of said first flange, and said inner planar surface of said second flange define a channel, each said ring segment including an arcuate semi-cylindrical central edge, and said arcuate semi-circular central edge of each said ring segment of said segmented ring are disposed in said channel.

4. An eduction tube assembly as claimed in claim 3 wherein said spaced holes in said segmented ring aligned with said spaced holes in said second flange are threaded, and a threaded stud is screwed into each said threaded hole, and each said stud extends through one of said spaced holes in said second flange.

5. An eduction tube assembly as claimed in claim 4 wherein said first flange is a large flange and said second flange is a small flange with an outer peripheral edge surface and is smaller than said first flange and said pattern of spaced holes in said small flange is located on a bolt circle diameter smaller than a bolt circle diameter upon which said spaced holes in said large flange are located.

6. An eduction tube assembly as claimed in claim 5 wherein said spaced holes in said large flange are disposed radially outward of said outer peripheral edge surface of said small flange a distance sufficient to provide access to said spaced holes.

7. An eduction tube assembly as claimed in claim 5 wherein said tubular body portion includes an outer cylindrical body surface and said ring segments of said segmented ring each include an arcuate semi-circular central edge disposed in facing relation to said outer cylindrical body surface of said tubular body portion and radial edges of each said ring segment are disposed in facing relation with the radial edges of the other of said ring segments.

8. An eduction tube assembly as claimed in claim 5 wherein said small flange includes notches along said outer peripheral edge surface, aligned with said spaced holes in said large flange to permit access to said spaced holes in said large flange.

9. An eduction tube assembly as claimed in claim 8 wherein said small flange defines an outer top gasket contact surface wherein said studs are of a length to extend beyond said outer top gasket contact surface of said small flange sufficiently to receive a connection flange thereon.

10. An eduction tube assembly as claimed in claim 8 wherein said spaced holes in said large flange are radially elongated.

11. An eduction tube assembly as claimed in claim 8 wherein a number of said spaced holes in said small flange is less than a number of spaced holes in said large flange.

12. A unitary transition flange member assembly to join spaced flanged elements, said transition flange member comprising:
 a tubular body portion defining a central passage,
 a first flange at one end of said body portion having a pattern of spaced holes in a circumferential spacing,
 a second flange at the other end of said tubular body portion having a pattern of spaced holes positioned apart on radial lines bisecting the spacing of said holes on said first flange,
 said first flange having an inner planar surface facing said second flange,
 said second flange having an inner planar surface facing said first flange,
 a segmented ring defined by a first ring segment and second ring segment, said segments including a planar top surface and a planar bottom surface,
 said segmented ring disposed between said inner planar surfaces of said first flange and said second flange and including a pattern of spaced holes aligned with said spaced holes in said first flange,
 and a pattern of spaced holes aligned with said spaced holes in said second flange.

13. A transition flange member assembly as claimed in claim 12 wherein said inner planar surfaces of said first flange and said second flange are spaced apart a distance slightly greater than a thickness of said ring segments of said segmented ring and said planar top surface and said planar bottom surface of said ring segments are disposed between said inner planar surfaces of said first flange and said second flange.

14. A transition flange member assembly as claimed in claim 13 wherein an outer cylindrical body surface of said tubular body portion of said transition flange member, said inner planar surface of said first flange, and said inner planar surface of said second flange define a channel, each said ring segment including an arcuate semi-cylindrical central edge, and said arcuate semi-circular central edge of each said ring segment of said segmented ring are disposed in said channel.

15. A transition flange member assembly as claimed in claim 14 wherein said spaced holes in said segmented ring aligned with said spaced holes in said second flange are threaded, and a threaded stud is screwed into each said threaded hole, and each said stud extends through one of said spaced holes in said second flange.

16. A transition flange member assembly as claimed in claim 15 wherein said first flange is a large flange and said second flange is a small flange with an outer peripheral edge surface and is smaller than said first flange and said pattern of spaced holes in said small flange is located on a bolt circle diameter smaller than a bolt circle diameter upon which said spaced holes in said large flange are located.

17. A transition flange member assembly as claimed in claim 16 wherein said small flange includes notches along said outer peripheral edge surface, aligned with said spaced holes in said large flange to permit access to said spaced holes in said large flange.

18. A transition flange member assembly as claimed in claim 17 wherein a number of said spaced holes in said small flange is less than a number of spaced holes in said large flange.

19. A transition flange member assembly as claimed in claim 18 wherein said small flange defines an outer top gasket contact surface wherein said studs are of a length to extend beyond said outer top gasket contact surface of said small flange sufficiently to receive a connection flange thereon.

20. A transition flange member assembly as claimed in claim 19 wherein said spaced holes in said large flange are disposed radially outward of said outer peripheral edge surface of said small flange a distance sufficient to provide access to said spaced holes.

21. A transition flange member assembly as claimed in claim 20 wherein said spaced holes in said large flange are radially elongated.

22. A transition flange member assembly as claimed in claim 21 wherein said ring segments of said segmented ring each include radial edges disposed in facing relation with the radial edges of the other of said ring segments.

* * * * *